(12) United States Patent
Gall et al.

(10) Patent No.: US 8,313,055 B2
(45) Date of Patent: Nov. 20, 2012

(54) AIRCRAFT HAVING A REDUCED ENVIRONMENTAL IMPACT

(75) Inventors: Pierre-Emmanuel Gall, Toulouse (FR); Christophe Cros, L'Union (FR)

(73) Assignee: Airbus Operations SAS, Toulouse (FR)

( * ) Notice: Subject to any disclaimer, the term of this patent is extended or adjusted under 35 U.S.C. 154(b) by 614 days.

(21) Appl. No.: 12/091,286

(22) PCT Filed: Oct. 23, 2006

(86) PCT No.: PCT/FR2006/002372
§ 371 (c)(1),
(2), (4) Date: Apr. 23, 2008

(87) PCT Pub. No.: WO2007/051914
PCT Pub. Date: May 10, 2007

(65) Prior Publication Data
US 2008/0258005 A1    Oct. 23, 2008

(30) Foreign Application Priority Data
Nov. 3, 2005 (FR) ..................................... 05 11176

(51) Int. Cl.
*B64D 27/00* (2006.01)
*B64C 11/48* (2006.01)
(52) U.S. Cl. ..................... 244/55; 244/1 N; 244/45 R
(58) Field of Classification Search .............. 244/55, 244/45 R, 1 N; D12/319, 339, 343
See application file for complete search history.

(56) References Cited

U.S. PATENT DOCUMENTS

| | | | | |
|---|---|---|---|---|
| D185,821 S | * | 8/1959 | Wolleat | D12/339 |
| D190,840 S | * | 7/1961 | Lear | D12/339 |
| D194,645 S | * | 2/1963 | Raspet | D12/339 |
| D197,933 S | * | 4/1964 | Sumner | D12/339 |
| D198,248 S | * | 5/1964 | Sumner | D12/339 |

(Continued)

FOREIGN PATENT DOCUMENTS
DE    78 08 902    11/1978

(Continued)

OTHER PUBLICATIONS

International Search Report dated Mar. 7, 2007 w/ English translation.

(Continued)

*Primary Examiner* — Michael Carone
*Assistant Examiner* — Steven Hawk
(74) *Attorney, Agent, or Firm* — Dickinson Wright PLLC (57) ABSTRACT

An aircraft having a propeller engine mounted at the rear of the aircraft, on the back thereof, such that the axis of the engine is parallel to the longitudinal axis of the aircraft. The aircraft has a cell, the rear part of which comprises a horizontal empennage and two vertical empennages, positioned one at each end of said horizontal empennage. The propeller is positioned vertically in line with the rear part of the cell, and the rear part of the cell forms a lateral and downward barrier, on each side of a plane of the propeller, that screens an acoustic intensity equal to approximately−5 dB with respect to a maximum acoustic intensity emitted by the engine.

8 Claims, 6 Drawing Sheets

U.S. PATENT DOCUMENTS

| | | | | |
|---|---|---|---|---|
| D219,843 S | * | 2/1971 | Fredericks | D12/339 |
| 3,576,300 A | * | 4/1971 | Palfreyman | 244/55 |
| 3,652,035 A | * | 3/1972 | Fredericks | 244/12.1 |
| 3,735,946 A | * | 5/1973 | Mullins | 244/55 |
| 3,807,665 A | * | 4/1974 | Coombe | 244/55 |
| 3,936,017 A | * | 2/1976 | Blythe et al. | 244/55 |
| 3,985,317 A | * | 10/1976 | Geraci et al. | 244/13 |
| 4,019,699 A | * | 4/1977 | Wintersdorff et al. | 244/121 |
| 4,036,452 A | * | 7/1977 | Schairer | 244/1 N |
| 4,149,688 A | * | 4/1979 | Miller, Jr. | 244/12.4 |
| 4,447,022 A | * | 5/1984 | Lion | 244/13 |
| 4,500,055 A | * | 2/1985 | Krojer | 244/55 |
| 4,772,179 A | * | 9/1988 | Bennett et al. | D12/339 |
| 4,881,700 A | * | 11/1989 | Sarh | 244/218 |
| 4,976,396 A | * | 12/1990 | Carlson et al. | 244/55 |
| 5,034,751 A | * | 7/1991 | Miller, Jr. | 244/55 |
| D363,696 S | * | 10/1995 | Kroo et al. | D12/331 |
| D364,600 S | * | 11/1995 | Andrews | D12/319 |
| 5,899,409 A | * | 5/1999 | Frediani | 244/45 R |
| D607,806 S | * | 1/2010 | Saint-Jalmes et al. | D12/319 |
| D608,720 S | * | 1/2010 | Saint-Jalmes et al. | D12/319 |
| D622,653 S | * | 8/2010 | Moore et al. | D12/319 |
| 7,900,865 B2 | * | 3/2011 | Moore et al. | 244/1 N |
| 8,016,233 B2 | * | 9/2011 | Moore et al. | 244/55 |
| 8,196,860 B2 | * | 6/2012 | Gall et al. | 244/55 |
| 2003/0168552 A1 | * | 9/2003 | Brown | 244/55 |
| 2006/0011779 A1 | * | 1/2006 | Cazals et al. | 244/55 |
| 2007/0023571 A1 | * | 2/2007 | Kawai et al. | 244/119 |
| 2007/0176047 A1 | * | 8/2007 | Moore et al. | 244/54 |
| 2008/0073459 A1 | * | 3/2008 | Cazals et al. | 244/13 |
| 2008/0142641 A1 | * | 6/2008 | Moore et al. | 244/55 |
| 2008/0191087 A1 | * | 8/2008 | Cros | 244/15 |
| 2009/0020643 A1 | * | 1/2009 | Gall et al. | 244/54 |

FOREIGN PATENT DOCUMENTS

| | | |
|---|---|---|
| GB | 1 397 068 | 6/1975 |
| GB | 1 480 340 | 7/1977 |

OTHER PUBLICATIONS

Written Opinion of the ISA w/ English translation.
Steinke S., "Aus Der Triekkiste Der Flugzeugentwiekler Airbus-Konzepte Fuer Uebermorgen," Flug Revue, Stuttgart, DE, vol. 1/2001, Jan. 2001, pp. 22-25.

* cited by examiner

AIRCRAFT HAVING A REDUCED ENVIRONMENTAL IMPACT

FIELD OF THE INVENTION

The present invention relates to an aircraft with reduced environmental impact.

BACKGROUND OF THE RELATED ART

It is known that propeller-type propulsion systems, for example turboprops with a single propeller or prop fans with contra-rotating propellers, display better energy efficiency than turbine engines.

However, most of existing aircraft are propelled by turbine engines which are therefore, on the one hand, greedy for fuel and, on the other hand, sources of environmental pollution through what they emit into the atmosphere.

Hence, as far as saving energy and reducing environmental pollution are concerned, it would be more advantageous for aircraft to be equipped with propeller-type propulsion systems rather than turbine engines.

However, in operation, propeller-type propulsion systems are even more noisy than turbine engines, which means that the advantage in terms of energy saving and reduction in environmental pollution from their emissions which are enjoyed when turbine engines are replaced by propeller-type propulsion systems, would be accompanied by the disadvantage of an increase in noise pollution. The noise pollution thus reached would be unacceptable and, in any event, difficult to reconcile with the legislation currently in force.

Furthermore, aircraft comprising:
- at least one turbine engine mounted at the rear of the aircraft, on the back thereof; and
- a cell, the rear part of which comprises a horizontal empennage and two vertical empennages positioned one at each end of said horizontal empennage, said rear part forming a barrier to the noise generated downwards by said turbine engine, are already known, for example from GB-1 397 068.

Of course, in a layout such as this, the axis of said turbine engine is parallel to the longitudinal axis of the aircraft which means that the noise generated by said engine and which, as is known, is emitted toward the front and toward the rear of this engine, spreads toward the front and toward the rear of said aircraft, only some of this noise being screened in the downwards direction by said screening surface of the rear part of the cell, provided that said horizontal empennage is positioned to the rear of the outlet of the nacelle of said turbine engine. The overall efficiency of the screen formed by the rear part of the cell is therefore not optimized.

SUMMARY OF THE INVENTION

The subject of the present invention is an aircraft of which the fuel consumption is close to that of a comparable propeller aircraft and of which the emission of noise towards the ground is at most equal to that of a, likewise comparable, turbine-engine aircraft.

To this end, according to the invention, the aircraft with reduced environmental impact, having a longitudinal axis and comprising:
- at least one engine mounted at the rear of the aircraft, on the back thereof, with its axis at least substantially parallel to said longitudinal axis of the aircraft; and
- a cell, the rear part of which comprises a horizontal empennage and two vertical empennages positioned one at each end of said horizontal empennage, said rear part of the cell forming a barrier at least to the noise generated downwards by said engine, is notable in that:
- said engine is of the type comprising at least one propeller; and
- said propeller is positioned vertically in line with said rear part of the cell that forms a noise barrier.

Indeed, and astonishingly, the applicant company has found that if, in an aircraft layout of the type recalled hereinabove and described in GB-1 397 068, the turbine engine is replaced by a propeller(s) propulsion system, then provided that said screening surface is positioned just below the propeller or propellers (whereas in GB-1 397 068 this screening surface is very much to the rear of the turbine engine outlet), then excellent attenuation of the noise of said propulsion system can be had, this attenuation being such that the noise emitted by this propulsion system, although intrinsically more intense that of a turbine engine, was far better screened by said rear part of the cell, and therefore far less intense in the surroundings of said aircraft.

One reason for this excellent result may be that the noise of a propeller is highly directional, the noise maximum being perceived near the plane of the propeller and said noise reducing sharply away from this plane. Thus, in an advantageous embodiment of the present invention, said rear part of the cell is dimensioned to act as a barrier, by each side of the plane of the propeller, to all that part of the noise that has an acoustic intensity higher than a predetermined fraction of the maximum intensity emitted by said engine. For example, the acoustic intensity screened by said rear part of the cell, on each side of said plane, is equal to at least approximately −5 dB with respect to said maximum intensity.

As a preference said propeller(s) is/are positioned behind said engine and is/are able to exert thrust on said aircraft. Thus, the propeller or propellers is or are located at a small cross-section point on the fuselage of the aircraft, leaving more space for installing it (them). In addition the propeller(s) is (are) thus distant from the passenger cabin, and this is then beneficial to passenger comfort.

Furthermore, in order as far as possible to limit the fuel consumption of the engine, it is preferable for said propeller or propellers not to have any peripheral cowling.

In addition, it is advantageous for said engine to comprise two coaxial contra-rotating propellers. This is because in this case, the diameter of said propellers is smaller, making it easier to integrate said engine onto the aircraft.

In order to avoid any aerodynamic interaction and any vibrational, particularly acoustic, interaction, between the propeller(s) and the rear part of the cell, it is advantageous for the shortest distance between the end of a propeller and said rear part to be at least equal to 10% of the diameter of said propeller.

Of course, the aircraft according to the present invention may be a single-engine aircraft and have just one propeller(s) engine mounted at the rear in the way described hereinabove. However, in addition to the latter engine, it may also comprise at least two turbine engines borne symmetrically by the wings of said aircraft. An arrangement such as this is advantageous in that the rear propeller(s) engine, which is not very fuel-greedy and is not very noisy because of the noise screen according to the invention, means that the power (and therefore the noise and fuel consumption) of the turbine engines, can be reduced.

However, in a preferred embodiment of the aircraft according to the present invention, two propeller(s) engines are provided, these being positioned one beside the other with their axes parallel.

In this case, in order to avoid any aerodynamic and acoustic interaction between the two engines (and also to allow an operator to fit between the propellers during maintenance operations), a space of at least 60 cm is left between the facing ends of the propellers.

BRIEF DESCRIPTION OF THE DRAWINGS

The figures of the attached drawing will make it easy to understand how the invention may be embodied. In these figures, identical references denote elements which are similar.

DETAILED DESCRIPTION OF THE INVENTION

Figure 1:
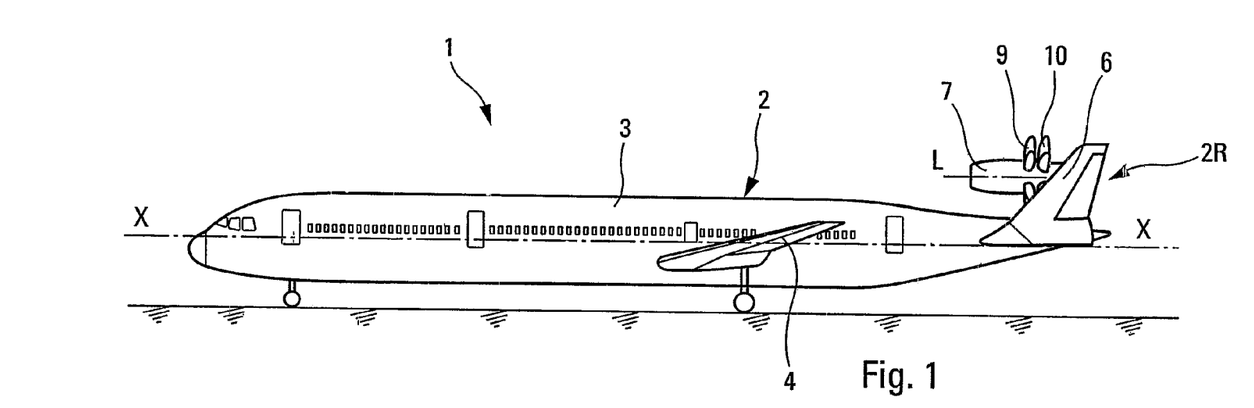
FIGS. 1, 2 and 3 schematically illustrate a preferred embodiment of the aircraft according to the present invention, in a side view, a front view and a top view, respectively.
Figure 2:
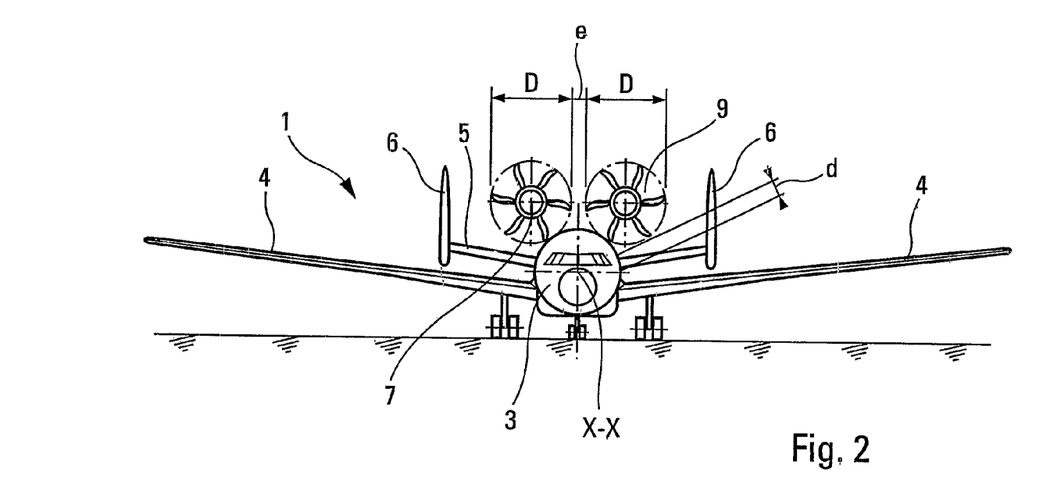
Figure 3:
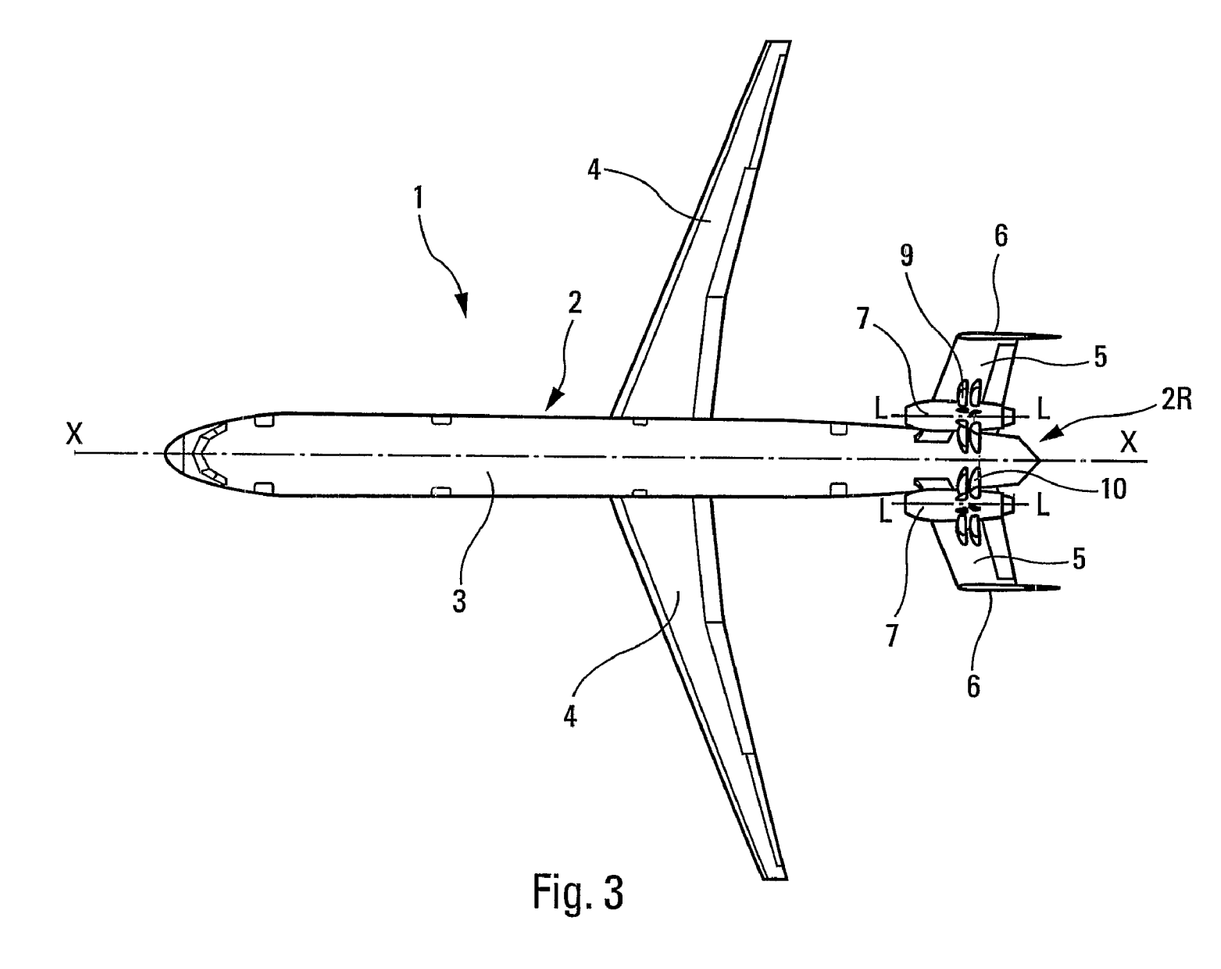

The commercial airplane 1, according to the invention and depicted schematically in FIGS. 1 to 3, has a longitudinal axis X-X and comprises a cell 2 which consists of a fuselage 3, of wings 4, of a horizontal empennage 5 and of two vertical empennages 6. The wings 4 do not bear any engine and the vertical empennages 6 are positioned at the ends of the horizontal empennage 5.

Mounted at the rear of the airplane 1 are two propeller engines 7, positioned on the back of said airplane with their axes L-L parallel to the longitudinal axis X-X. The engines 7 are borne by pylons 8 (see also FIGS. 4 and 5) and are positioned side by side. At the rear end, each engine 7 has two un-cowled thrust-generating contra-rotating propellers 9, 10 of diameter D. The two propellers 9, on the one hand, and the two propellers 10, on the other, are positioned facing one another with a space e of at least 60 cm between them. Furthermore, the shortest distance d between the end of the propellers 9, 10 and said cell 2 is at least equal to 10% of said diameter D.

With respect to the rear part 2R of the cell 2—which rear part comprises the rear part 3R of the fuselage 3, the horizontal empennage 5 and the vertical empennages 6—the propellers 9 and 10 of the two engines 7 are positioned vertically in line with said horizontal empennage 5.

Figure 4:
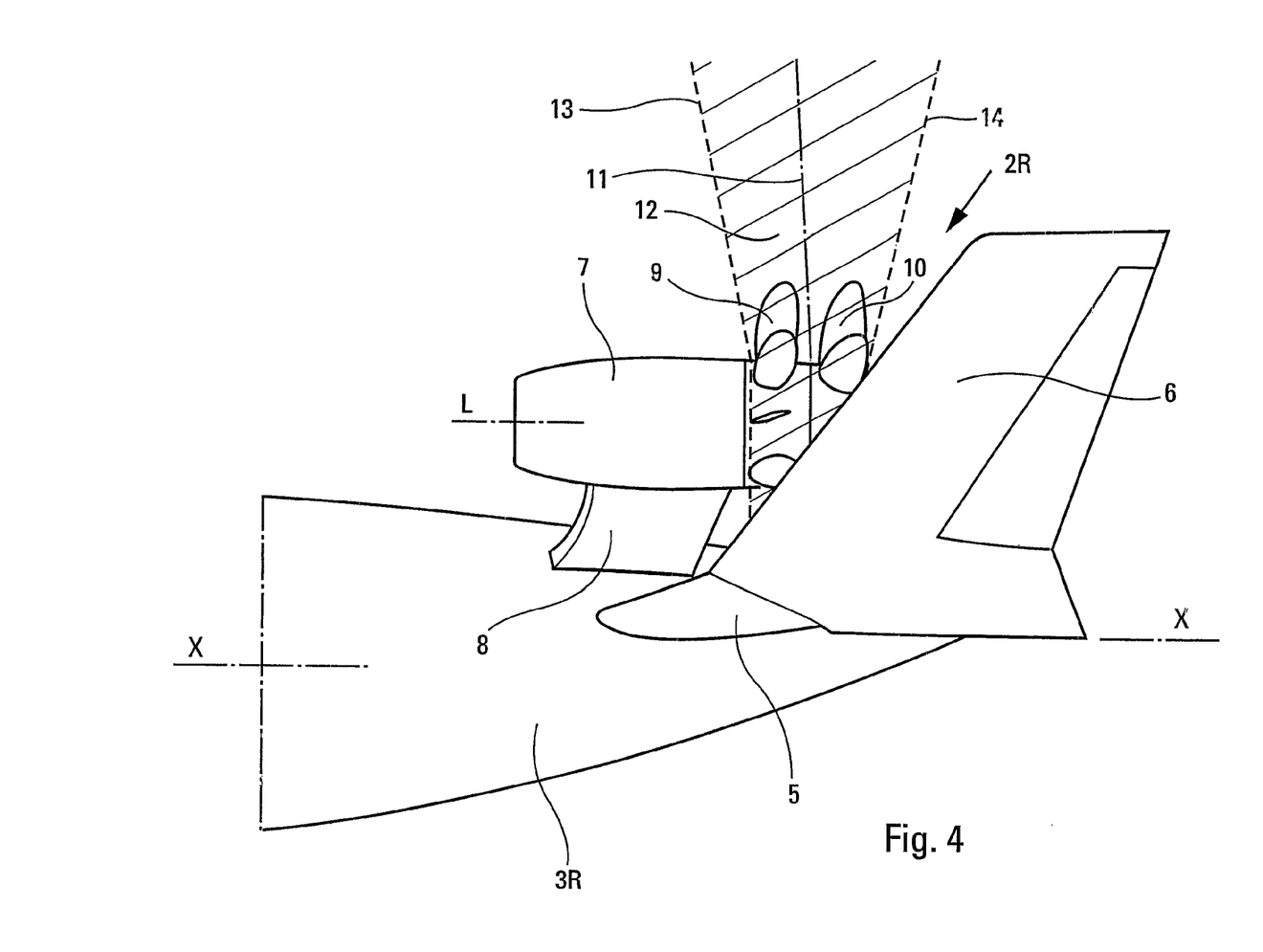
FIG. 4 is a schematic side view, on a larger scale, of the rear part of the aircraft of FIGS. 1 to 3.
Figure 5:
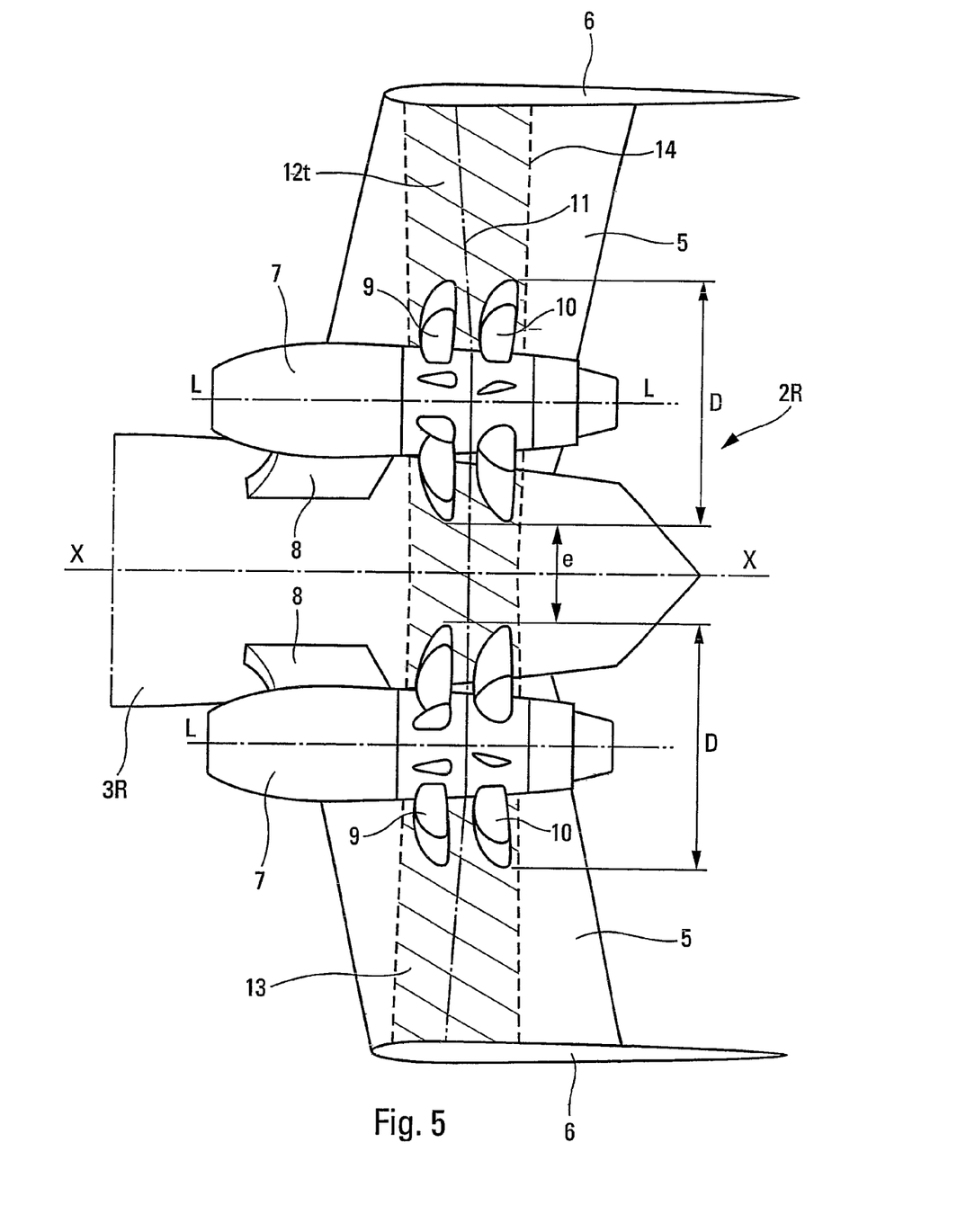
FIG. 5 is a schematic top view corresponding to FIG. 4.

In operation, each of said propellers 9 and 10 generates noise the acoustic intensity of which is at a maximum near its plane and which decreases rapidly away from this plane along the axes L-L. In this instance, the two pairs of propellers 9 and 10 generate, about said axes L-L, a total noise the maximum acoustic intensity of which is a substantially planar surface 11 passing between the propellers 9 and 10 of each pair, as depicted in FIGS. 4 and 5. In the latter two figures, a noise zone 12, defined by a front limit 13 and a rear limit 14 positioned on each side of the surface 11 of maximum acoustic intensity and in which the acoustic intensity is equal to −5 dB with respect to said maximum acoustic intensity, has also been depicted.

Hence, according to the present invention, the relative layout of the propellers 9, 10, of the horizontal empennage 5 and of the vertical empennages 6 is such that, near said engines 7, said noise zone 12 lies on the inside of the channel formed by said horizontal 5 and vertical 6 empennages, as can be clearly seen in FIG. 5 in which the trace 12t of the zone 12 has been drawn onto the horizontal empennage 5.

Thus, the noise emitted by the engines 7 is screened, in the downwards direction, by the horizontal empennage 5 and, partially to the side, by the vertical empennages 6.

As a result, during takeoff and landing, the noise emitted by the engines 7 of the airplane 1 towards the ground is greatly reduced because it is screened by the horizontal empennage 5 and, in part, by the vertical empennages 6.

Figure 6:
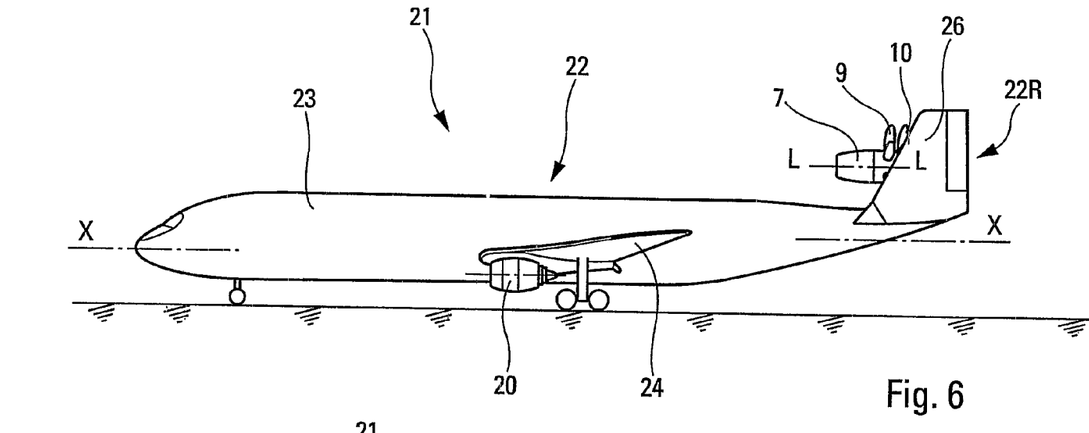
FIGS. 6, 7 and 8 schematically illustrate another embodiment of the aircraft according to the present invention, in a side view, a front view and a top view, respectively.
Figure 7:
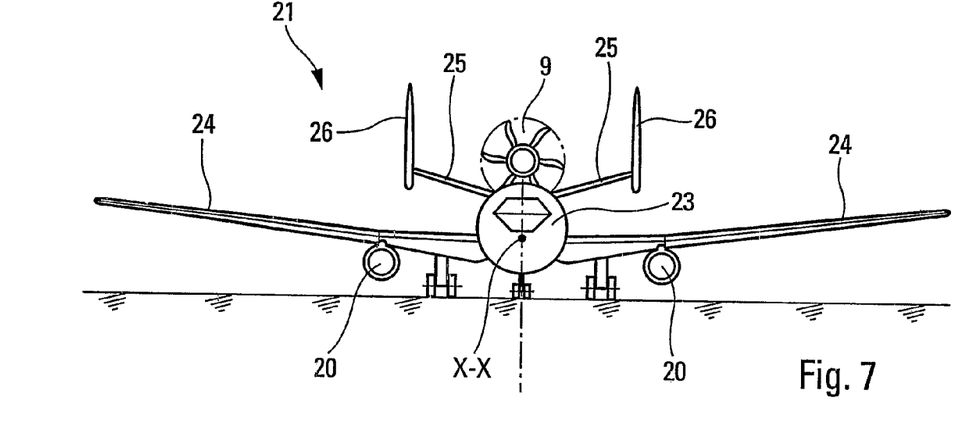
Figure 8:
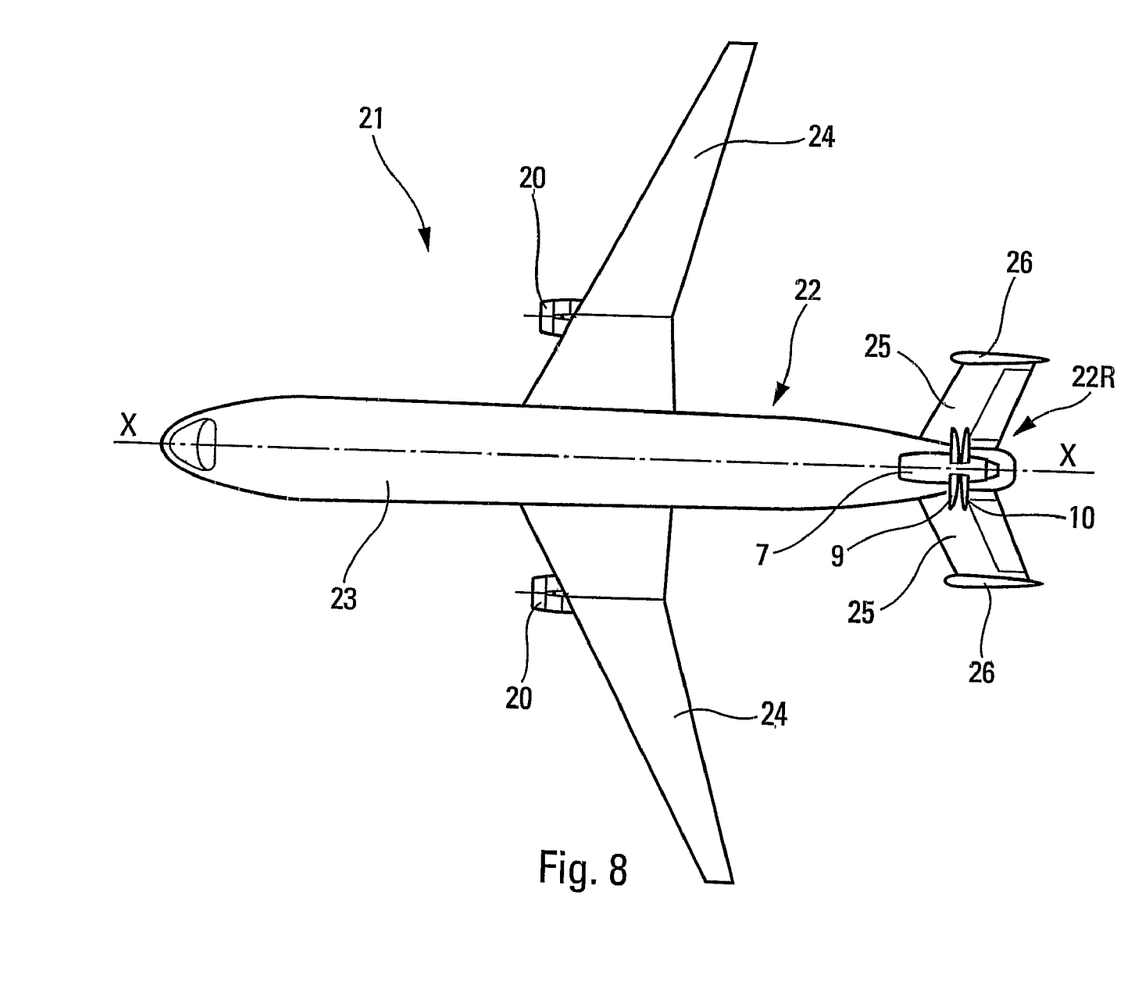

The commercial airplane 21 according to the present invention and depicted schematically in FIGS. 6 to 8 also has a longitudinal axis X-X and comprises a cell 22, consisting of a fuselage 23, of wings 24, of a horizontal empennage 25 and two vertical empennages 26. The wings 24 each bear a turbine engine 20 and the vertical empennages 26 are positioned at the ends of the horizontal empennage 5.

Mounted centrally at the rear of the airplane 21 is a single engine 7 with contra-rotating propellers 9 and 10, the axis L-L of which is parallel to the axis X-X and positioned in the same vertical plane.

In a similar way to that which was described with reference to FIGS. 1 to 5, the layout of the propellers 9, 10 and of the empennages 25 and 26 is such that the noise generated by said propellers is screened in the downwards direction of said airplane 21 by the rear part 22R of the cell 22, of which said empennages 25 and 26 form a part.

It will be noted that, by comparison with a conventional twin turbine engine airplane of equal performance, the airplane 21 can use turbine engines 20 which are less powerful (and therefore less noisy) because of the presence of the engine 7 at the rear. Overall, the airplane 21 may be less noisy and consume less fuel than such a twin turbine engine airplane.

The invention claimed is:

1. A commercial aircraft with reduced environmental impact, having a longitudinal axis and comprising:
    a fuselage including a cell at a rear portion of the fuselage;
    at least one engine comprising two coaxial contra-rotating propellers, with the at least one engine being mounted at the cell on the fuselage, and the at least one engine having an axis parallel to said longitudinal axis of the aircraft;
    a horizontal empennage at a rear part of the cell;
    wings mounted on the fuselage, forward of said cell; and
    two vertical empennages at the cell, wherein the two vertical empennages comprise control surfaces and are positioned such that each vertical empennage is located at each end of said horizontal empennage, and both of said propellers are positioned vertically in line with said rear part of the cell, wherein the vertical and horizontal empennages are configured to form a lateral and downward noise barrier screen on each side of the at least one engine and inside a channel formed by the horizontal and vertical empennages, which noise barrier screen provides an acoustic intensity at the engine equal to at least −5 dB with respect to a maximum acoustic intensity emitted by said engine.

2. The aircraft as claimed in claim 1, wherein said propellers are positioned behind said engine and exert thrust on said aircraft.

3. The aircraft as claimed in claim 1, wherein said propellers do not have any peripheral cowling.

4. The aircraft as claimed in claim 1, wherein the shortest distance between the end of the propellers and said rear part of the cell is at least equal to 10% of the diameter of said propellers.

5. The aircraft as claimed in claim 1, further comprising at least two turbine engines, each of the at least two turbine engines being carried symmetrically by the wings.

6. The aircraft as claimed in claim 1, further comprising two propeller engines mounted on the rear portion of the fuselage, positioned one beside the other, and having parallel axes.

7. The aircraft as claimed in claim 6, wherein the distance between the ends of the propellers of said engines is at least 60 cm.

8. The aircraft as claimed in claim 6, wherein the wings do not bear any engine.

* * * * *